(12) United States Patent
Carberry et al.

(10) Patent No.: US 6,467,971 B1
(45) Date of Patent: Oct. 22, 2002

(54) REMOVABLE OPTICAL ADAPTER AND RECEPTOR

(75) Inventors: John Carberry; Michael L. Smith, both of Jefferson City, TN (US); Richard Racinskas, Coppell, TX (US)

(73) Assignee: Neptec Optical Solutions, Inc., Jefferson City, TN (US)

( * ) Notice: Subject to any disclaimer, the term of this patent is extended or adjusted under 35 U.S.C. 154(b) by 0 days.

(21) Appl. No.: 09/715,582

(22) Filed: Nov. 17, 2000

Related U.S. Application Data (63) Continuation-in-part of application No. 09/685,116, filed on Oct. 10, 2000.

(51) Int. Cl.[7] .................................................. G02B 6/38
(52) U.S. Cl. .......................................... 385/58; 385/70
(58) Field of Search ................................ 385/115, 120, 385/133, 24, 43, 70, 55–60

(56) References Cited

U.S. PATENT DOCUMENTS

| | | | |
|---|---|---|---|
| 4,820,185 A | 4/1989 | Moulin | |
| 5,214,735 A | 5/1993 | Henneberger et al. | |
| 5,274,729 A | 12/1993 | King et al. | |
| 5,717,801 A | * 2/1998 | Smiley | 385/60 |
| 5,909,526 A | 6/1999 | Roth et al. | |
| 6,186,670 B1 | 2/2001 | Austin et al. | |

* cited by examiner

Primary Examiner—Akm E. Ullah
Assistant Examiner—Jerry T Rahll
(74) Attorney, Agent, or Firm—Pitts & Brittian PC (57) ABSTRACT

An apparatus which does not require the opening of a box in order to remove an adapter for fiber optic connectors. In one embodiment comprising a removable optical adapter and receptor, the adapter has a flange extending outwardly from an adapter body. The receptor is a mounting plate with a through-opening, which is slightly larger than the adapter flange, and a slot disposed parallel to a front surface. The receptor is foxed to a box, which contains at least one fiber optic connector. The adapter flange is inserted into the through-opening until it seats on a lip or shoulder adjacent to the slot. When the adapter is rotated, the adapter flange engages the slot. Another embodiment utilizes tabs on a removable adapter plate which are received by notches in a through-opening in the receptor. The removable adapter plate has a shoulder which prevents the plate from passing completely through the receptor. Once inserted, the plate is rotated and locked in place. The removable adapter plate receives a standard fiber optic adapter. The receptor has a front and back surface which can be parallel, in which case the adapter, when inserted into the receptor, is perpendicular to the box face, or it can have a front and back surface which form the shape of a wedge, in which case the adapter forms an angle defined by the long axis of the adapter body and the plane of the box face.

22 Claims, 9 Drawing Sheets

REMOVABLE OPTICAL ADAPTER AND RECEPTOR

CROSS-REFERENCE TO RELATED APPLICATIONS

This application is a Continuation-in-Part of Ser. No. 09/685,116, filed on Oct. 10, 2000.

STATEMENT REGARDING FEDERALLY SPONSORED RESEARCH OR DEVELOPMENT

Not Applicable

BACKGROUND OF THE INVENTION

1. Field of Invention

This invention pertains to adapters for fiber optic cables. More particularly, this invention pertains to a fiber optic adapter which is removable from a receptor attached to a box.

2. Description of the Related Art

Optical fibers are commonly used for the transmission of all types of data, including telecommunications, video, and computer data. Unlike copper cables which use mechanical connections to terminate to equipment, fiber optic cables rely upon optical connectors for termination.

An optical connector consists of a ferrule, through which the optical fiber is fed. The distal end of the ferrule and fiber combination is polished to a precise endface geometry. The ferrule and fiber endface is butted to another fiber optic cable's ferrule and fiber endface, bringing the fiber endfaces into precise physical contact. In order to minimize signal loss, the fiber and ferrule endfaces must have a very smooth and clean surface. Cleanliness of the fiber and ferrule endface is critical to the good performance of fiber optic connectors. Recently, awareness and concern about connector cleanliness has grown dramatically due to a number of factors, including the value of traffic, the growth of bandwidth, the growth of mechanical connector use, and network sensitivity.

Considering the small size of fiber cores (9 microns for a single mode fiber), it is easy to understand how contaminants such as dirt or oil can affect the performance of fiber-optic connectors. The polished surfaces can be scratched when the connectors are repeatedly mated, if the optical fibers rotate after they come in contact, or if a foreign particle is on one of the connector end faces. Also, the connectors and associated hardware are constructed of materials which are rich in hydrocarbons and materials which tend to outgas and create relatively large partial pressures of these materials. The space wherein the fibers and connectors mate is so small that it can be considered a capillary space. As a result, these gaseous products tend to "wick" into the space and deposit. For these reasons, it is now understood that the polished optical surfaces must be protected from physical damage and contamination and must be periodically cleaned.

Fiber optic connectors are commonly available in various sizes and configurations. Commercially available connector types include SC, LC, FC, ST, MT-RJ, SMA, MU, LX.5, and E2000, among others. It is important to note that all connectors must be mated in an adapter, which consists of a housing geometry suitable to the connector type and a "floating" split sleeve that accepts and aligns the connectors for precise mating of the small fiber cores used for single mode fiber. The molded glass-filled thermoplastic alignment sleeves commonly used can also be a source of contamination because the ferrules scrape the material of the sleeve each time the connectors are mated.

It is common to fit the adapter with locking means which permit the easy insertion of the adapter into a receiving aperture in a box. Typically, spring clips are used. These spring clips are pushed against the adapter body when the adapter is inserted into the aperture. When the adapter is fully inserted, the spring clips return to an extended position, preventing the adapter from being pulled out of the aperture. Accordingly, the adapter cannot be removed without access to the inside of the box.

Often, the adapter defines the interface between an outside box connector and an inside box connector. Normally, only the connector on the outside is accessible for cleaning, while the connector on the inside is inaccessible without opening the box. In most cases the manufacturer of the box prohibits opening the box because of the potential for damaging sensitive and critical internal components, among other reasons. Therefore, it would be beneficial to be able to remove the adapter and remove the inside connector from the adapter without opening the box. After cleaning, it would be beneficial to be able to replace the inside connector and the adapter without opening the box. Furthermore, fiber optic cable has very strict bend radius requirements and it would be beneficial if the adapter were positioned on the box such that cable bends are minimized.

Therefore, it is an object of the present invention to provide a means for removing an adapter from a box after the adapter has been secured to the box.

It is a further object of the present invention to be able to remove and replace the adapter without entry into the box.

It is a still further object of the present invention to remove and replace the adapter from the box without resort to tools or other devices.

Another object of the present invention is to provide a means for mounting the adapter to the box such that the fiber optic cable exits the adapter in the general direction of the cable routing.

Other objects and advantages over the prior art will become apparent to those skilled in the art upon reading the detailed description together with the drawings as described as follows.

BRIEF SUMMARY OF THE INVENTION

According to an embodiment of the present invention, a removable adapter and a receptor is disclosed, whereby the adapter is releasably secured in the receptor. The adapter has an adapter flange bisecting the adapter body. The receptor or mounting plate, which is attached to a box face, has a first aperture or through-opening penetrating its front surface and a second aperture or slot in the same plane as the front surface but disposed between the front surface and the back surface of the plate. The second aperture intersects the through-opening. The through-opening has a seating lip or shoulder which protrudes into the through-opening adjacent to the back surface of the mounting plate. The adapter is inserted into the through-opening and rotated such that the adapter flange is lockably disposed in the second aperture. The means for locking include the use of detents which lockably engage recesses and the use of a tapered slot, by which the adapter flange is wedged in the slot when the adapter is rotated.

An alternative embodiment of the receptor includes forming the receptor such that its front surface and its mounting surface are not parallel, but instead, the planes formed by the two surfaces intersect, resulting in the receptor having a wedge shape. In this embodiment, after the adapter is lockably disposed in the second aperture, the adapter's long axis is not perpendicular to the box face on which the receptor is disposed, but is at an approximately 22 degree angle to a line perpendicular to the box face. This angle serves to reduce bending of the fiber optic cable as it is routed away from the adapter.

Another embodiment of the present invention includes a receptor, which is attached to a box face, and a removable adapter plate, which has means for receiving a standard adapter. The receptor has a round through-opening which has opposing notches. The removable adapter plate has a cylindrical body with two tabs. The through-opening in the receptor receives the removable adapter plate, with the tabs passing through the notches and being disposed on the posterior of the receptor. The removable adapter plate has a shoulder which rests on the anterior of the receptor and prevents the adapter plate from passing completely through the through-opening in the receptor. After the removable adapter plate is inserted into the through-opening in the receptor, the removable adapter plate is rotated and locked in place. The means for locking include the use of detents which lockably engage recesses and the use of a tapered thickness of the receptor, by which the receptor is wedged between the tabs and the shoulder when the removable adapter plate is rotated. The removable adapter plate has a through-opening into which the adapter can be inserted and locked in place.

BRIEF DESCRIPTION OF THE SEVERAL VIEWS OF THE DRAWINGS

The above-mentioned features of the invention will become more clearly understood from the following detailed description of the invention read together with the drawing in which.

DETAILED DESCRIPTION OF THE INVENTION

An apparatus for releasably mating a pair of fiber optic connectors, wherein one of the pair of fiber optic connectors originates from inside a box. The apparatus comprises a receptor, generally illustrated as 20, 50, and 1020 in the figures, and an adapter with a flange, generally illustrated as 10 in the figures, or a removable adapter plate, generally illustrated as 1014 in the figures.

Figure 1:
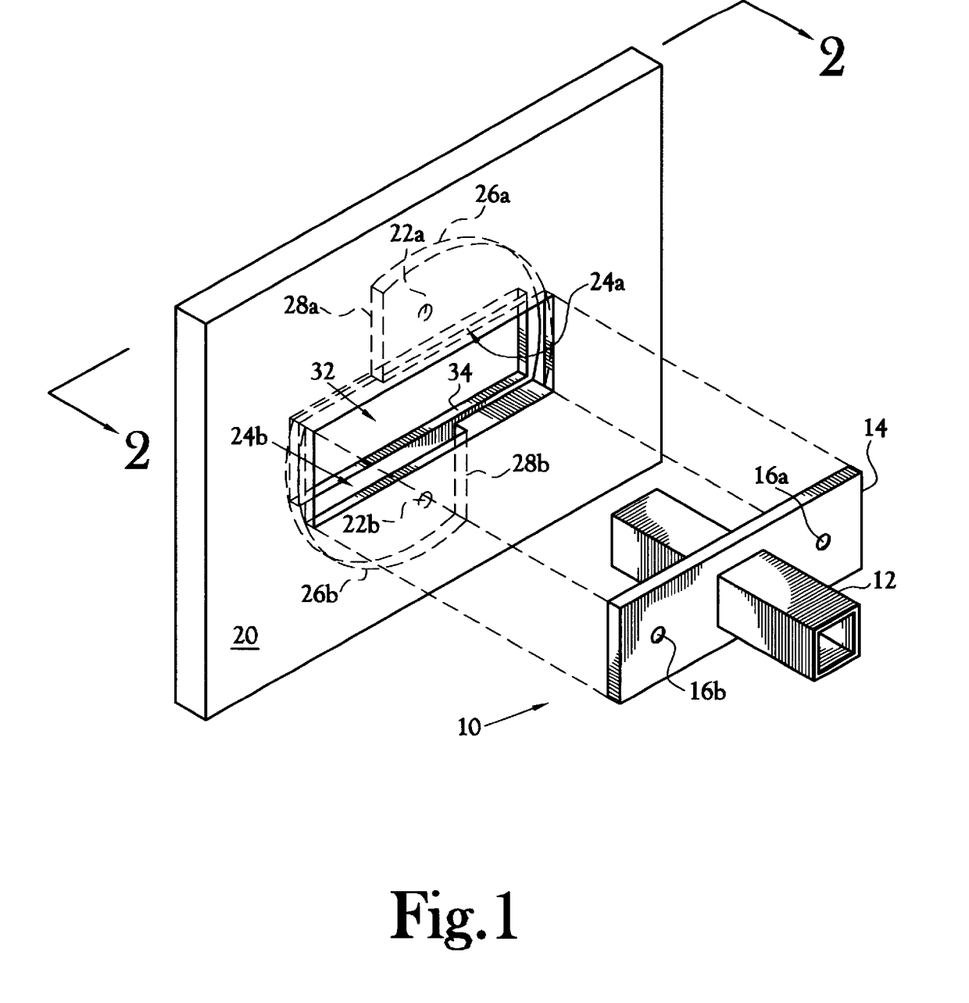
FIG. 1 perspective view of the adapter and receptor.

FIG. 1 illustrates a first embodiment of the present invention which comprises a removable adapter 10 and a receptor which is shown as a mounting plate 20. In the illustrated embodiments, the adapter 10 is an adapter for SC type fiber optic connectors. Those skilled in the art will recognize that adapters for any of the various connect types and that adapters for other types of media besides optical fiber can be used without interfering with the objects and advantages of the present invention.

Figure 6:
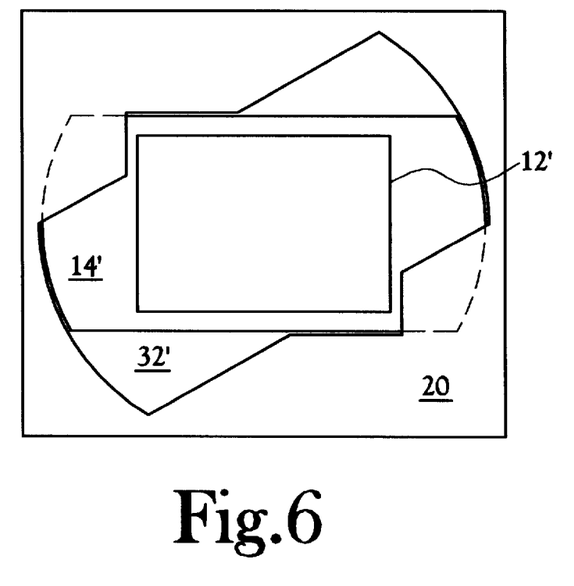
FIG. 6 illustrates a front view of a second embodiment of the adapter, which is inserted and rotated in the receptor.
Figure 7:
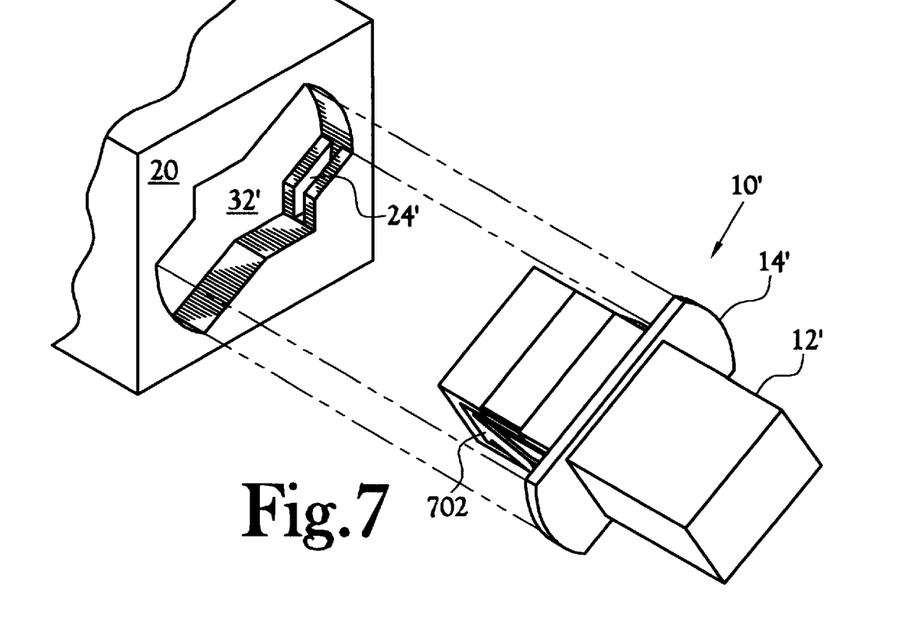
FIG. 7 is a perspective view of the second embodiment of the adapter.
Figure 8:
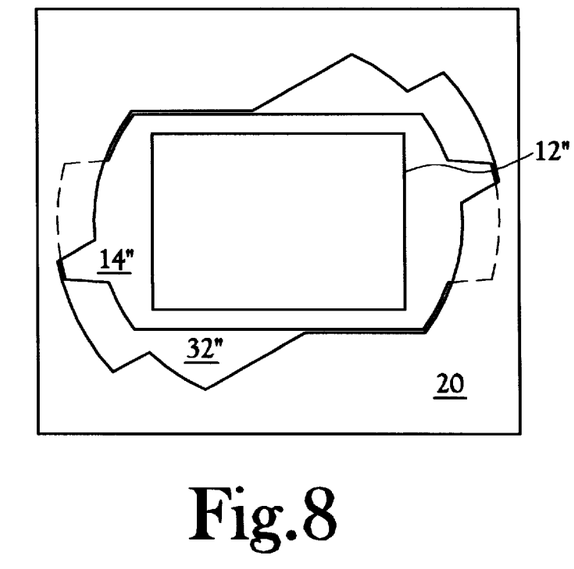
FIG. 8 illustrates a front view of a third embodiment of the adapter, which is inserted and rotated in the receptor.
Figure 9:
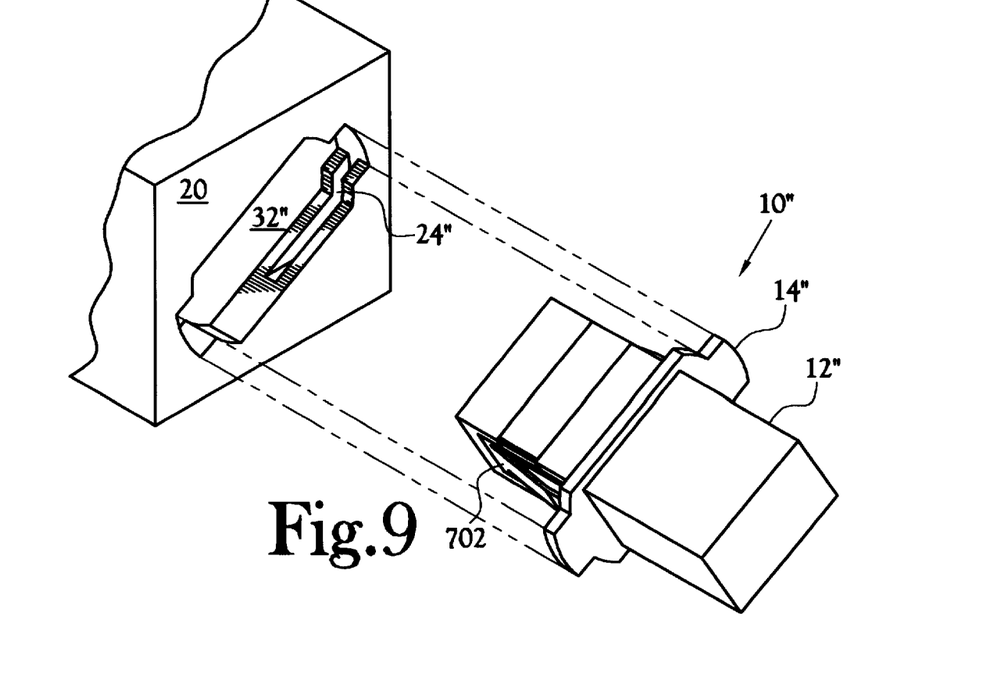
FIG. 9 is a perspective view of the third embodiment of the adapter.

The adapter 10 has a body 12 bisected perpendicularly by a rectangular adapter flange or tabs 14. Those skilled in the art will recognize that the configuration and orientation of the adapter flange 14 may be varied without interfering with the objects and advantages of the present invention. FIGS. 6 and 7 illustrate a second embodiment where the distal ends of the adapter flange 14a are curved. FIGS. 8 and 9 illustrate a third embodiment where the adapter flange 14b has distal ends which are curved with each end having a tab. Other examples of alternative embodiments may include orienting the adapter body 12 such that it is not perpendicular to the adapter body 12. The adapter flange 14 may be located near a distal end of the adapter body 12. Also, the adapter body 12 may not be centered in the adapter flange 14. Another example of an alternative embodiment is where the adapter flange 14 extends from only one side of the adapter body 12, that is, there is only a single tab extending outwardly from the body 12. It should be noted that the adapter body 12 is illustrated in FIGS. 7 and 9 as having a spring clip 702. Those skilled in the art will recognize that the adapter body 12 may be a single integral part of the adapter 10 or the adapter flange 14 may lockably receive the adapter body 12, thereby forming the adapter 10, without interfering with the objects and advantages of the present invention.

Referring to FIG. 1, the receptor, which in the first illustrated embodiment is a mounting plate 20, has a first aperture or through-opening 32 which is of the same general shape as the adapter flange 14 and is slightly larger than the outside dimensions of the adapter flange 14 such that the adapter flange 14 can be inserted into the through-opening 32.

Figure 2:
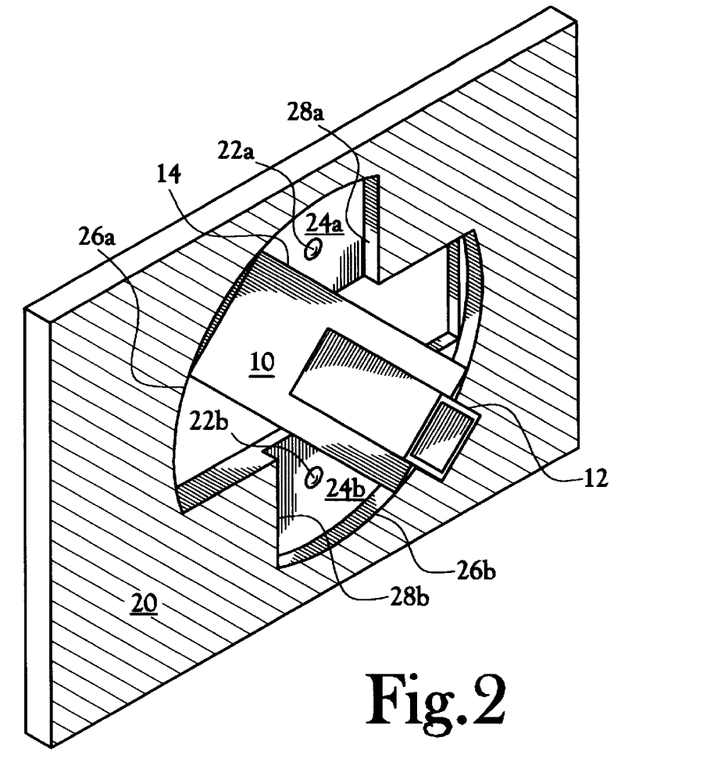
FIG. 2 illustrates a cut-away view of the receptor with an adapter inserted and partially rotated to the locked position.

The mounting plate 20 has a second aperture or slot 24. The slots 24a, 24b are disposed between the front surface and the back surface of the mounting plate 20 and each slot 24a, 24b extends on either side of the through-opening 32. Each of the slots 24a, 24b comprises an inside back surface and an inside front surface which are separated sufficiently that the adapter flange 14 passes between the two surfaces when the adapter 10 is rotated. A section view, looking towards the front, of the mounting plate 20 showing the second aperture 24 is illustrated in FIG. 2. Those skilled in the art will recognize that the number of slots 24 is directly related to the number of tabs formed by the adapter flange 14 and that this number can vary without interfering with the objects and advantages of the present invention.

One embodiment of the mounting plate 20 has, instead of a through-opening 32 with a front-side aperture and a back-side aperture of equal size, a through-opening 32 with a seating lip or shoulder 34. The shoulder 34 results in the through-opening 32 having the front-side aperture larger than the back-side aperture. The shoulder 34 extends into the through-opening 32 such that the adapter flange 14 is stopped from passing completely through the mounting plate 20 and when the adapter 10 is seated on the shoulder 34, the adapter 10 is adjacent to the slot 24. The seating lip 34 extends into the through-opening 32 such that the adapter body 12 has sufficient clearance to rotate without being obstructed by the seating lip 34.

Each of the slots 24a, 24b has a curved surface 26a, 26b defined by an arc with a radius larger than the distance from the adapter body 12 center point to the most distant corner of the adapter flange 14. This curved surface permits the adapter flange or tabs 14 to rotate around the adapter body 12 center point in the second aperture 24. Additionally, each slot 24a, 24b has a stop surface 28a, 28b upon which the leading edge of the adapter flange or tab 14 rests after the adapter 10 has been fully rotated. In other words, each tab 14 rotates around the center of the adapter body 12 until it is seated in the slot 24 by resting against the stop surface 28.

The adapter 10 is locked in the fully rotated position when detents 22a, 22b on the inside front surface of each slot 24a, 24b engage recesses 16a, 16b in the adapter flange 14. Those skilled in the art will recognize that, without interfering with the objects and advantages of the present invention, the detents 22a, 22b may be disposed on either the inside back surface or the inside front surface of the slots 24a, 24b, provided the recesses 16a, 16b are disposed on the corresponding surface of the adapter flange 14. Alternatively, the detents may be disposed on the adapter flange 14 with the recesses being disposed on the corresponding inside surface of the slots 24a, 24b.

Figure 3:
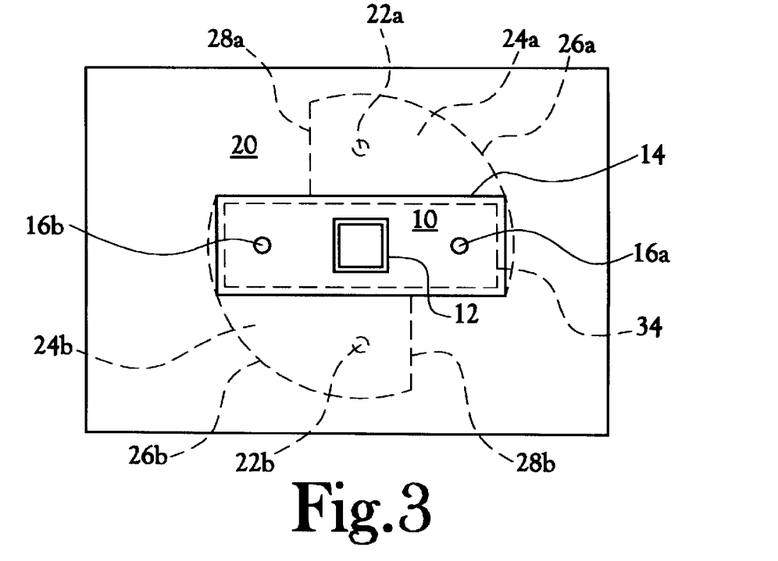
FIG. 3 illustrates a front view of an adapter, which is inserted, but not rotated, in the receptor.

FIG. 3 illustrates a front view of the mounting plate 20 with the adapter 10 inserted into the through-opening 32 and seated on the lip 34. From the position illustrated in FIG. 3, the adapter 10 is rotated counterclockwise until the detents 22 engage the recesses 16 in the adapter flange 14. Those skilled in the art will recognize that the orientation of the slots 24 may be such that the adapter 10 is rotated clockwise without interfering with the objects and advantages of the present invention.

Figure 4:
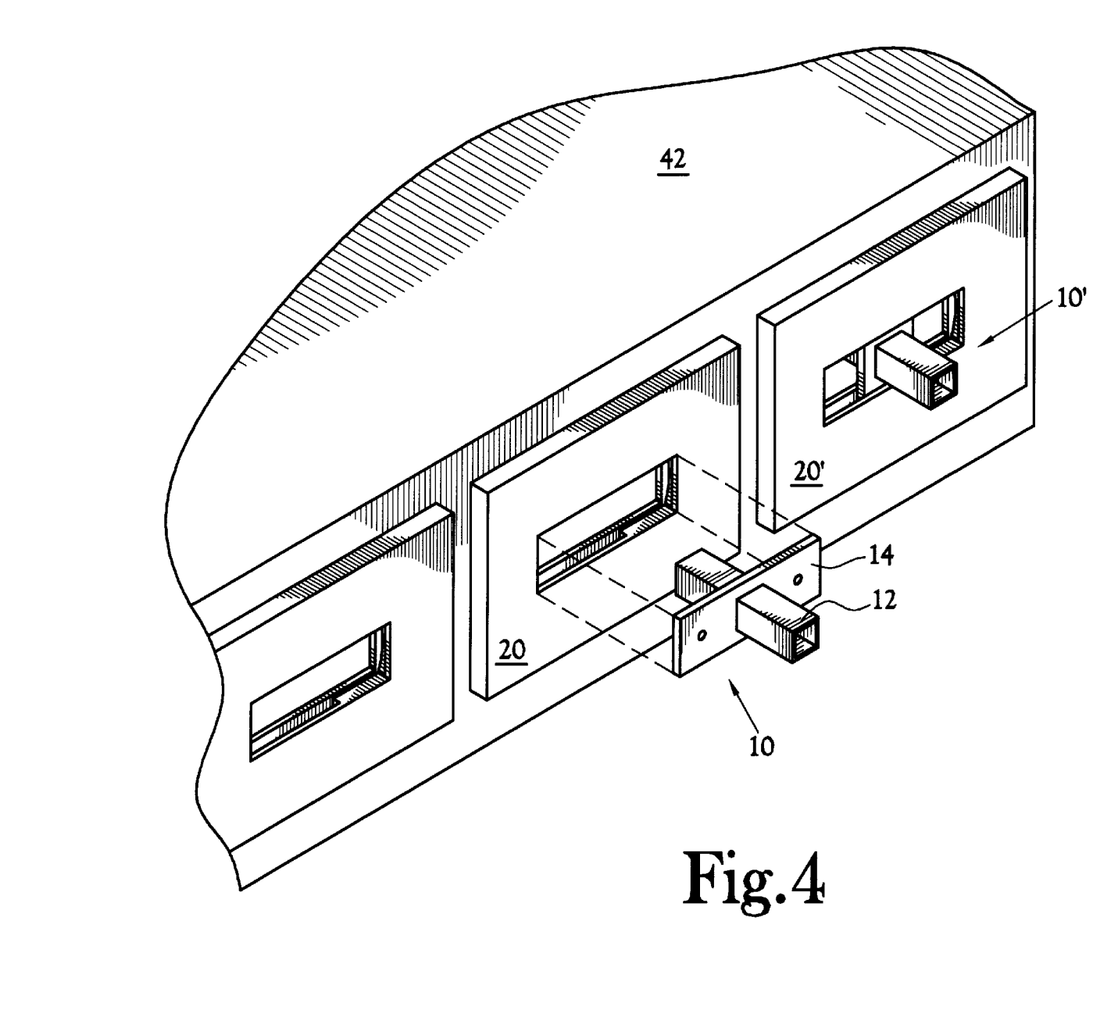
FIG. 4 is a perspective view of a plurality of receptors attached to a box.

FIG. 4 illustrates a plurality of mounting plates 20 fixed to a box 42. The back surface of the mounting plate 20 has means for fixedly securing the mounting plate 20 over a mounting aperture in the face of a box 42. The mounting aperture in the face of the box 42 permits the end of the adapter 10 to protrude into the box 42 after the mounting plate 20 is fixedly attached to the face of the box 42. Those skilled in the art will recognize that a box is used for illustrative purposes and that receptors can be attached to devices other than boxes without interfering with the objects and advantages of the present invention.

Figure 5:
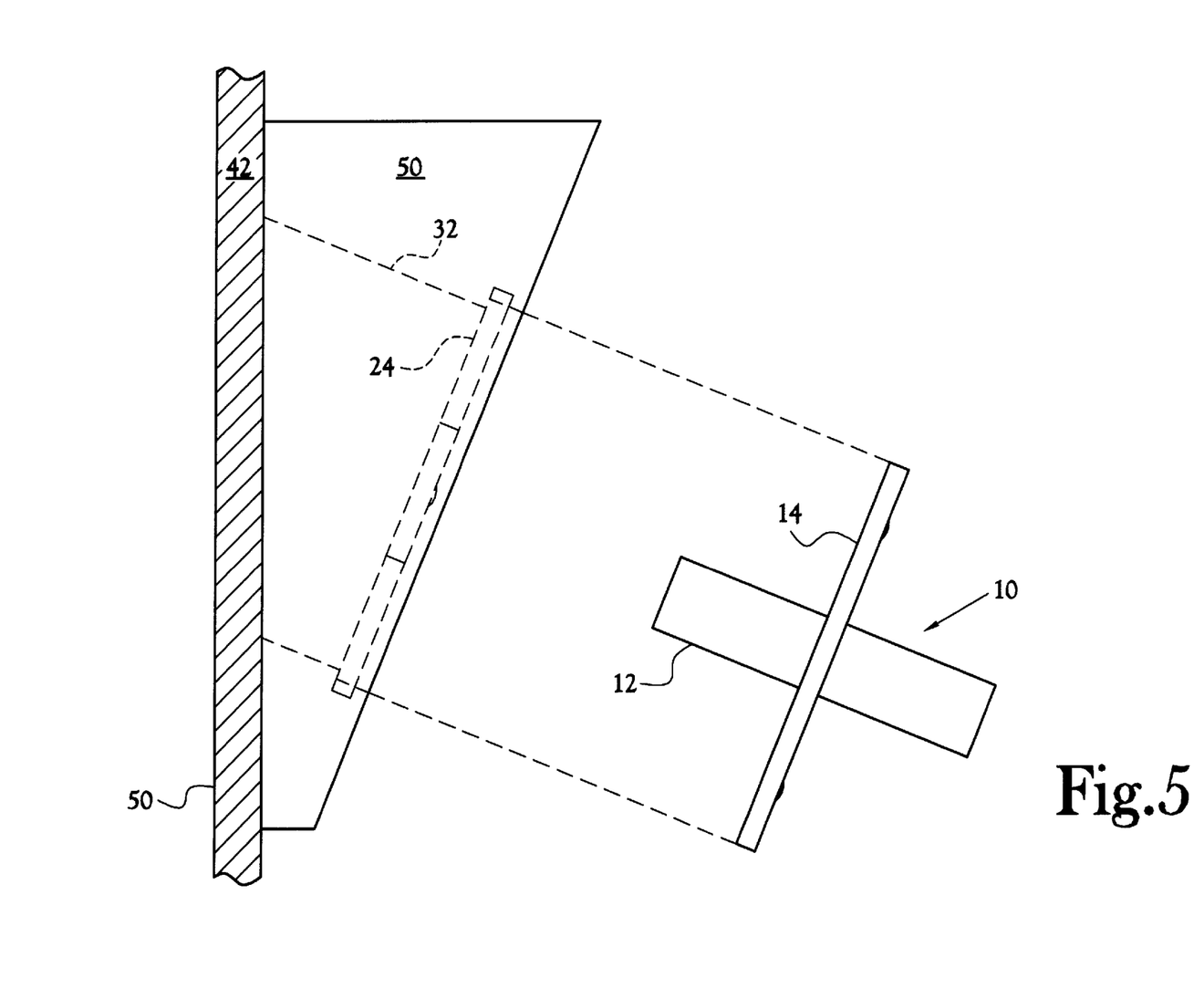
FIG. 5 is a top plan view of an alternative embodiment of the receptor where the receptor has a wedge shape.

FIG. 5 illustrates a top plan view of a mounting plate 50, which is another embodiment of a receptor. Unlike the mounting plate 20 of the first embodiment, which has a front surface parallel to the back surface, the front surface and back surface of receptor 50 form planes which intersect, forming a wedge shaped receptor 50. The through-opening 32 of the receptor 50 has walls that are perpendicular to the plane of the front surface. The second aperture 24 of the receptor 50 is parallel to the plane of the front surface. This configuration results in the adapter 10 protruding from the receptor 50 at an angle from perpendicular which is equal to the angle between the front and back surfaces of the receptor 50. The illustrated embodiment for this alternative has an angle of approximately 22 degrees between the front and back surfaces of the receptor 50. Those skilled in the art will recognize that the angle between the front and back surfaces of the receptor 50 may vary without interfering with the objects and advantages of the present invention.

Figure 10:
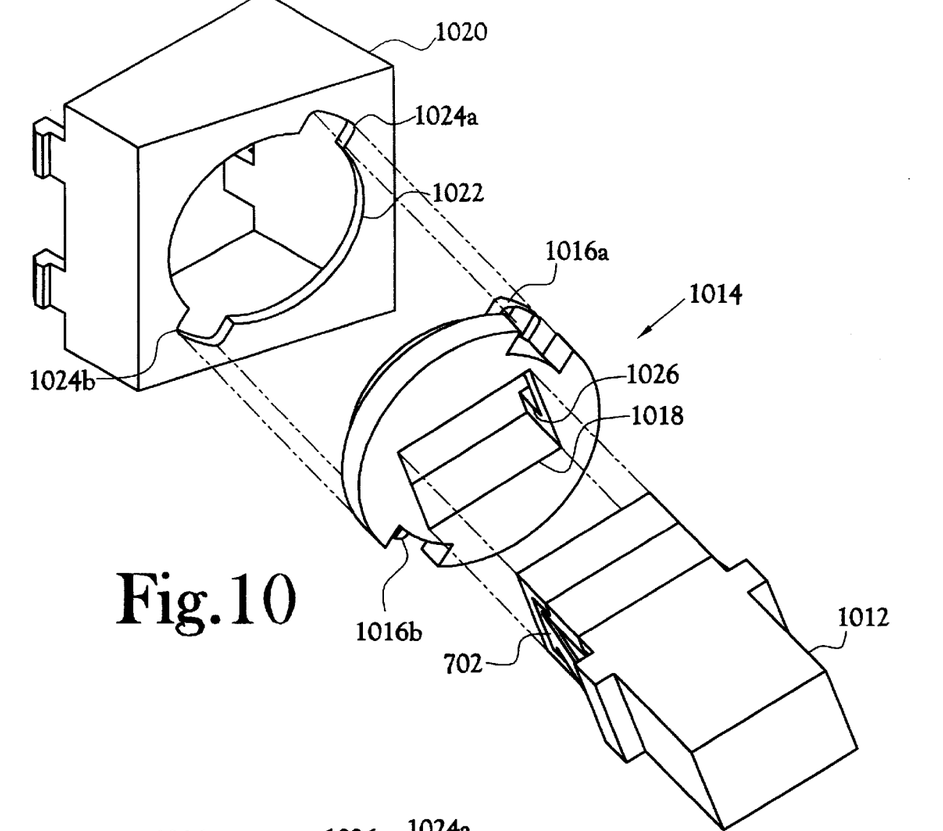
FIG. 10 is a perspective view of a fourth embodiment of the adapter and receptor.

FIG. 10 illustrates a fourth embodiment of the present invention. The receptor 1020 has a round through-opening 1022 with opposing notches 1024. The removable adapter plate 1014 has tabs 1016 which are received by the notches 1024 in the receptor 1020. Those skilled in the art will recognize that the number of notches and tabs may vary without interfering with the objects and advantages of the present invention.

The removable adapter plate 1014 has a front surface or shoulder 1202 which is larger than the through-opening 1022 and prevents the removable adapter plate 1014 from passing completely through the through-opening 1022. The removable adapter plate 1014 is inserted in the through-opening 1022 and locked in place when the removable adapter plate 1014 is rotated. The means for locking include first, the use of detents which lockably engage recesses and second, the use of a tapered thickness of the receptor 1020, by which the receptor 1020 is wedged between the tabs 1016 and the shoulder 1202 when the removable adapter plate 1014 is rotated. Those skilled in art will recognize that other means for locking the removable adapter plate 1014 in the receptor 1020 may be used without interfering with the objects and advantages of the present invention.

The adapter 1012 is shown with a spring clip 702, which when the adapter 1012 is inserted into the adapter plate through-opening 1018, has leaf springs that engage the recesses 1026 and locks the adapter 1012 in place. The spring clip 702 is commonly known as a means for locking an adapter 1012 in a mounting aperture. Those skilled in the art will recognize that other means for locking the adapter in the removable adapter plate 1014 may be used without interfering with the objects and advantages of the present invention. Additionally, those skilled in the art will recognize that the adapter 1012 and the removable adapter plate 1014 may be fabricated as a single unit without interfering with the objects and advantages of the present invention.

Figure 11:
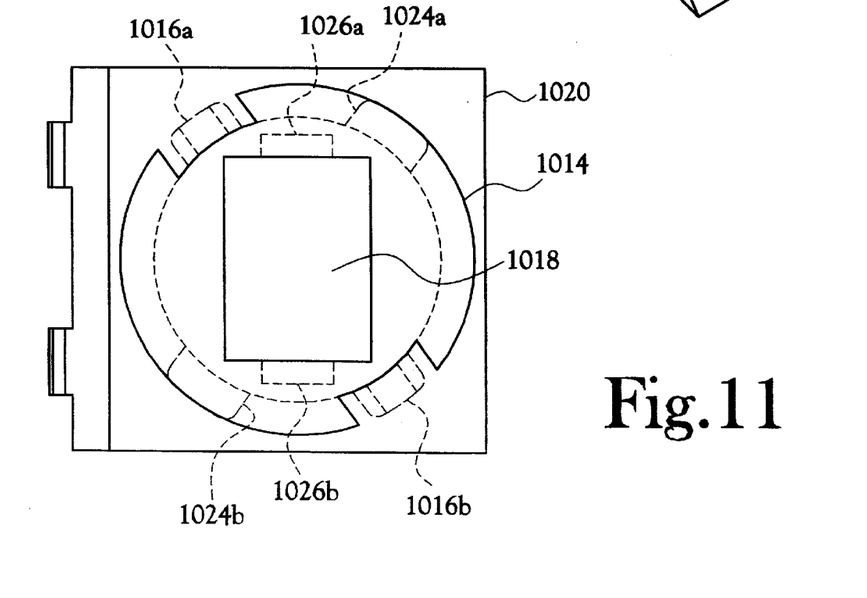
FIG. 11 illustrates a front view of the fourth embodiment of the adapter, which is inserted and rotated in the receptor.

FIG. 11 shows the front view of the fourth embodiment with the removable adapter plate 1014 inserted in the through-opening 1022 of the receptor 1020 and rotated counter-clockwise to the locked position.

Figure 12:
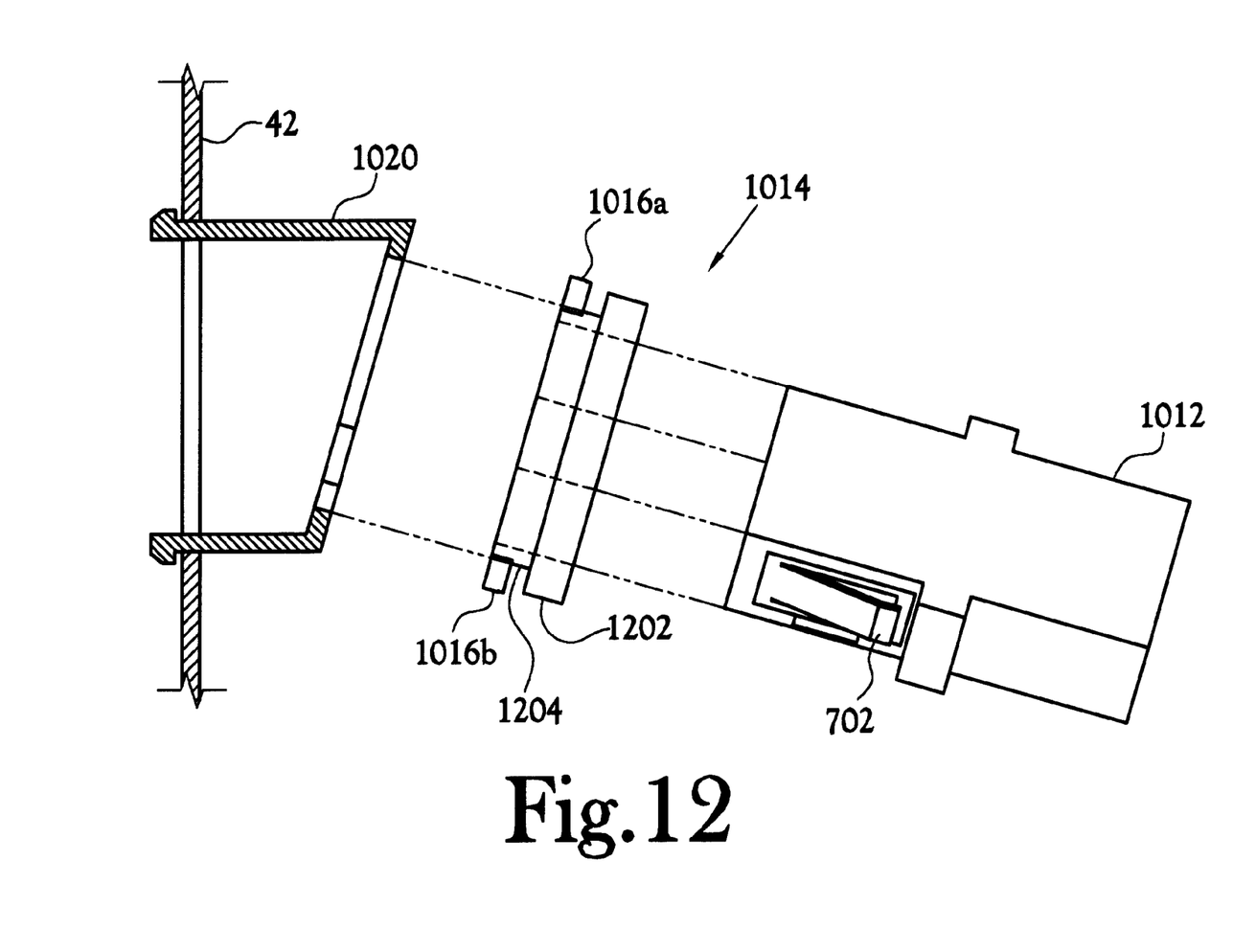
FIG. 12 is a top plan view of the fourth embodiment of the receptor.

FIG. 12 is a top section view of the invention showing receptor 1020 attached to a surface of box 42 and the removable adapter plate 1014 and the adapter 1012 in line with the aperture in the adapter plate 1014. The removable adapter plate 1014 is oriented to the same position as the removable adapter plate 1014 shown in FIG. 13. Tabs 1016 are shown in FIG. 12 protruding beyond the cylindrical body 1204 of the removable adapter plate 1014. The tabs 1016 and the cylindrical body 1204 are sized to fit into through-opening 1022. FIG. 12 also shows the shoulder 1202, which after the removable adapter plate 1014 is inserted into the through-opening 1022, rests against the receptor 1020.

Figure 13:
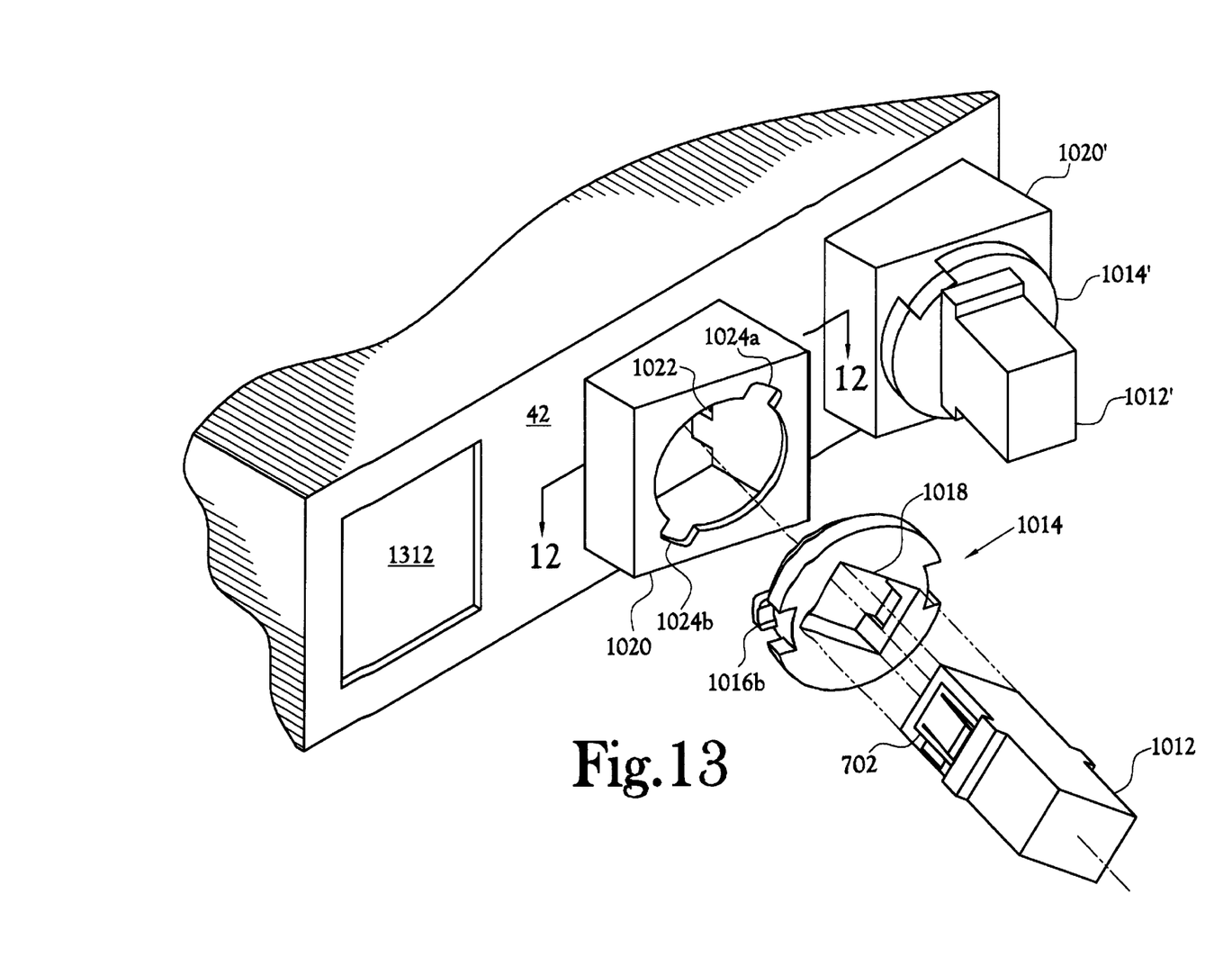
FIG. 13 is a perspective view of a plurality of the fourth embodiment of receptors attached to a box face.

FIG. 13 shows a surface of a box 42 with three mounting apertures 1312. Receptors 1020 are inserted in two of the mounting apertures 1312. The receptor 1020' is fixed to the surface of box 42 with means for mounting that engages one of the mounting apertures 1312. The removable adapter plate 1014' is inserted in receptor 1020' and locked in place. The adapter 1012' is inserted in the removable adapter plate 1014'.

FIG. 13 also shows the receptor 1020 fixed to the surface of box 42 with means for mounting that engages one of the mounting apertures 1312. A removable adapter plate 1014 is shown in line with the aperture 1020, and an adapter 1012 is in line with the aperture 1018. FIG. 13 shows, for illustrative purposes, the removable adapter plate 1014 rotated, such that the tabs 1016 are not positioned to be inserted directly in the notches 1024.

From the forgoing description, it will be recognized by those skilled in the art that a receptor, a removable fiber optic adapter, and a removable adapter plate offering advantages over the prior art has been provided. Specifically, the receptor, the adapter, and the removable adapter plate provide a means for quickly and conveniently accessing the connectors plugged into the adapter. Also, the receptor permits the adapter to be positioned such that the outside cable which exits the adapter is angled in the direction of the cable as it is routed away from the box.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. An apparatus for releasably mating a pair of fiber optic connectors, wherein one of the pair of fiber optic connectors originates from inside a box, said apparatus comprising:
    an adapter having an adapter body and an adapter flange, said adapter body having a first fiber optic connector end and an opposite second fiber optic connector end, said first connector end integrally associated with said second connector end, said first connector end and said second connector end axially aligned; and
    a receptor having a through-opening to releasably receive said adapter flange, said receptor having an aperture in communication with said through-opening, said receptor having a front surface and a back surface, said aperture defined by a slot between said front surface and said back surface, said aperture receiving said adapter flange when said adapter flange rotates within said through-opening.

2. The apparatus of claim 1 wherein said apparatus further comprises means for lockably securing said adapter flange in said aperture.

3. The apparatus of claim 1 wherein said receptor is a mounting plate with a front surface and a back surface disposed in substantially parallel planes.

4. The apparatus of claim 1 wherein said receptor has a front surface and a back surface disposed in intersecting planes; whereby said receptor has a wedge shape.

5. The apparatus of claim 1 wherein said through-opening has a shoulder disposed between a back surface of said receptor and a back inside surface of said aperture;
    whereby said adapter flange engages said shoulder when said through-opening receives said adapter flange and said aperture receives said adapter flange.

6. An apparatus for releasably mating a pair of fiber optic connectors, wherein one of the pair of fiber optic connectors originates from inside a box, said apparatus comprising:
    an adapter including a coupler configured to releasably receive a pair of fiber optic connectors at a first coupler end and an opposite second coupler end, said adapter having at least one tab extending outwardly from said coupler; and
    a receptor defining a through-opening configured to releasably receive said adapter, said receptor defining at least one slot in communication with said through-opening, said at least one slot receiving said at least one tab when said at least one tab rotates within said through-opening.

7. The apparatus of claim 6 wherein said apparatus further comprises means for lockably securing said adapter in said receptor.

8. The apparatus of claim 6 wherein said receptor is a mounting plate with a front surface and a back surface disposed in substantially parallel planes.

9. The apparatus of claim 6 wherein said receptor has a front surface and a back surface disposed in intersecting planes; whereby said receptor has a wedge shape.

10. The apparatus of claim 6 wherein said through-opening has a shoulder disposed between a back surface of said receptor and a back inside surface of said at least one slot;
    whereby said at least one tab engages said shoulder when said through-opening receives said at least one tab and said at least one slot receives said at least one tab.

11. An apparatus for releasably mating a pair of fiber optic connectors, wherein one of the pair of fiber optic connectors originates from inside a box, said apparatus comprising:
    means for releasably coupling a pair of connectors; and
    means for releasably securing said means for releasably coupling in a fixed position to a box.

12. The apparatus of claim 11 wherein said means for releasably securing comprises
    means for receiving means for releasably coupling.

13. The apparatus of claim 12 wherein said means for releasably securing further comprises
    means for rotating means for releasably coupling.

14. The apparatus of claim 13 wherein said means for releasably securing further comprises
    means for releasably locking means for releasably coupling.

15. An apparatus for releasably mating a pair of fiber optic connectors, wherein one of the pair of fiber optic connectors originates from inside a box, said apparatus comprising:
    means for releasably coupling a pair of connectors;
    means for receiving means for releasably coupling;
    means for rotating means for releasably coupling; and
    means for releasably locking means for releasably coupling;
    whereby said means for releasably coupling is releasably secured to a box.

16. An apparatus for releasably mating a pair of fiber optic connectors, wherein one of the pair of fiber optic connectors originates from inside a box, said apparatus comprising:
    a removable adapter plate having a cylindrical body, said removable adapter plate having at least one tab projecting radially beyond said first cylindrical body;
    an adapter configured to releasably receive a pair of fiber optic connectors at a first adapter end and an opposite second adapter end, said removable adapter plate receiving said adapter; and
    a receptor defining a through-opening between an anterior surface and a posterior surface, said through-opening having at least one notch, and said through-opening configured to releasably receive said cylindrical body and said at least one tab.

17. The apparatus of claim 16 wherein said apparatus further comprises means for lockably securing said removable adapter plate in said receptor.

18. The apparatus of claim 16 wherein said removable adapter plate further comprises a shoulder on a distal end of said cylindrical body, said shoulder engaging said anterior surface of said receptor, said shoulder cooperating with said receptor such that said at least one tab cooperates with said posterior surface.

19. The apparatus of claim 16 wherein said receptor includes means for mounting to a surface.

20. The apparatus of claim 19 wherein said means for mounting results in said surface being substantially parallel to said anterior surface of said receptor.

21. The apparatus of claim 19 wherein said means for mounting results in said surface and said anterior surface of said receptor lying in intersecting planes; whereby said receptor forms a wedge shape.

22. The apparatus of claim 16 wherein said removable adapter plate includes means for receiving an adapter.

* * * * *